US012363149B2

(12) United States Patent
Schmidt et al.

(10) Patent No.: US 12,363,149 B2
(45) Date of Patent: Jul. 15, 2025

(54) METHOD FOR MONITORING A DATA NETWORK IN A MOTOR VEHICLE, AND SWITCH DEVICE, AND MOTOR VEHICLE

(71) Applicants: AUDI AG, Ingolstadt (DE); TTTECH AUTO AG, Vienna (AT)

(72) Inventors: Karsten Schmidt, Ingolstadt (DE); Bernhard Stangl, Vienna (AT); Costel Patrascu, Bukarest (RO); Alexandru Stireciu, Bukarest (RO)

(73) Assignees: AUDI AG, Ingolstadt (DE); TITECH AUTO AG, Vienna (AT)

( * ) Notice: Subject to any disclaimer, the term of this patent is extended or adjusted under 35 U.S.C. 154(b) by 0 days.

(21) Appl. No.: 17/918,482

(22) PCT Filed: Oct. 22, 2021

(86) PCT No.: PCT/EP2021/079302
§ 371 (c)(1),
(2) Date: Oct. 12, 2022

(87) PCT Pub. No.: WO2022/090064
PCT Pub. Date: May 5, 2022

(65) Prior Publication Data
US 2023/0254327 A1    Aug. 10, 2023

(30) Foreign Application Priority Data
Oct. 28, 2020   (DE) .................. 10 2020 128 284.2

(51) Int. Cl.
*H04L 9/40*   (2022.01)
*G06F 21/55*   (2013.01)
(Continued)

(52) U.S. Cl.
CPC ...... *H04L 63/1425* (2013.01); *H04L 63/1416* (2013.01); *H04L 67/12* (2013.01)

(58) Field of Classification Search
CPC ............. H04L 63/1425; H04L 63/1416; H04L 63/1408; H04L 67/12; H04L 2012/445;
(Continued)

(56) References Cited

U.S. PATENT DOCUMENTS 7,904,642 B1   3/2011   Gupta et al.
9,424,366 B1   8/2016   Gazit et al.
(Continued)

FOREIGN PATENT DOCUMENTS

CN   109 391 523 A     2/2019
DE   102018201718 A1   8/2019
(Continued)

OTHER PUBLICATIONS

International Preliminary Report on Patentability, mailed May 11, 2023, for International Patent Application No. PCT/EP2021/079302. (25 pages) (with English Translation).
(Continued)

*Primary Examiner* — Vu V Tran
(74) *Attorney, Agent, or Firm* — Seed IP Law Group LLP

(57) ABSTRACT

A method for monitoring a data network in a motor vehicle is provided, wherein a switch device is operated in the data network, in which physical ports for receiving and for transmitting data packets are interconnected via a switch circuit. A network processor reads out detection data in monitoring positions of the data packets and forms pseudo target determination data for an associative memory therefrom, which actually is to process target determination data for a target port determination, and it is examined if certain action data results, which signalizes a necessity of a detection action, by inputting the pseudo target determination data into the associative memory.

12 Claims, 1 Drawing Sheet

(51) Int. Cl.
  *G06F 21/56* (2013.01)
  *G06F 21/85* (2013.01)
  *H04L 12/40* (2006.01)
  *H04L 12/44* (2006.01)
  *H04L 67/12* (2022.01)

(58) Field of Classification Search
  CPC .......... H04L 2012/40273; H04L 12/40; G06F 21/552; G06F 21/566; G06F 21/85
  See application file for complete search history.

(56) References Cited

U.S. PATENT DOCUMENTS

| | | |
|---|---|---|
| 2002/0075714 A1 | 6/2002 | Pereira et al. |
| 2005/0216770 A1 | 9/2005 | Rowett et al. |
| 2007/0022474 A1 | 1/2007 | Rowett et al. |
| 2011/0080916 A1 | 4/2011 | Davies et al. |
| 2016/0337272 A1* | 11/2016 | Berman .................. H04L 49/70 |
| 2017/0318040 A1* | 11/2017 | Wang .................. H04L 63/1416 |
| 2018/0102987 A1* | 4/2018 | Yun ....................... H04L 49/208 |
| 2018/0262466 A1* | 9/2018 | Atad .................... H04L 63/0245 |
| 2019/0289102 A1 | 9/2019 | Goel et al. |
| 2020/0304532 A1* | 9/2020 | Haga .................. H04L 12/4625 |
| 2022/0038393 A1* | 2/2022 | Roy .................... H04L 49/3063 |

FOREIGN PATENT DOCUMENTS

| | | |
|---|---|---|
| EP | 3726790 A1 | 10/2020 |
| EP | 3442192 B1 | 1/2022 |

OTHER PUBLICATIONS

"Content-addressable memory," Wikipedia, archived Oct. 21, 2021, XP055967782, URL=https://en.wikipedia.org/w/index.php?title=Content-addressable_memory&oldid=1051053048, download date Nov. 15, 2022. (5 pages).

"Look-Aside Interface," Wikipedia, archived Dec. 14, 2020, XP055968078, URL=https://en.wikipedia.org/w/index.php?title=Look-Aside_Interface&oldid=994188436, download date Nov. 15, 2022. (1 page).

Extended European Search Report, mailed Oct. 27, 2022, for European Patent Application No. EP2021/079302. (26 pages).

International Search Report and Written Opinion, mailed Feb. 1, 2022, for International Patent Application No. PCT/EP2021/079302. (23 pages) (with English translation of International Search Report).

* cited by examiner

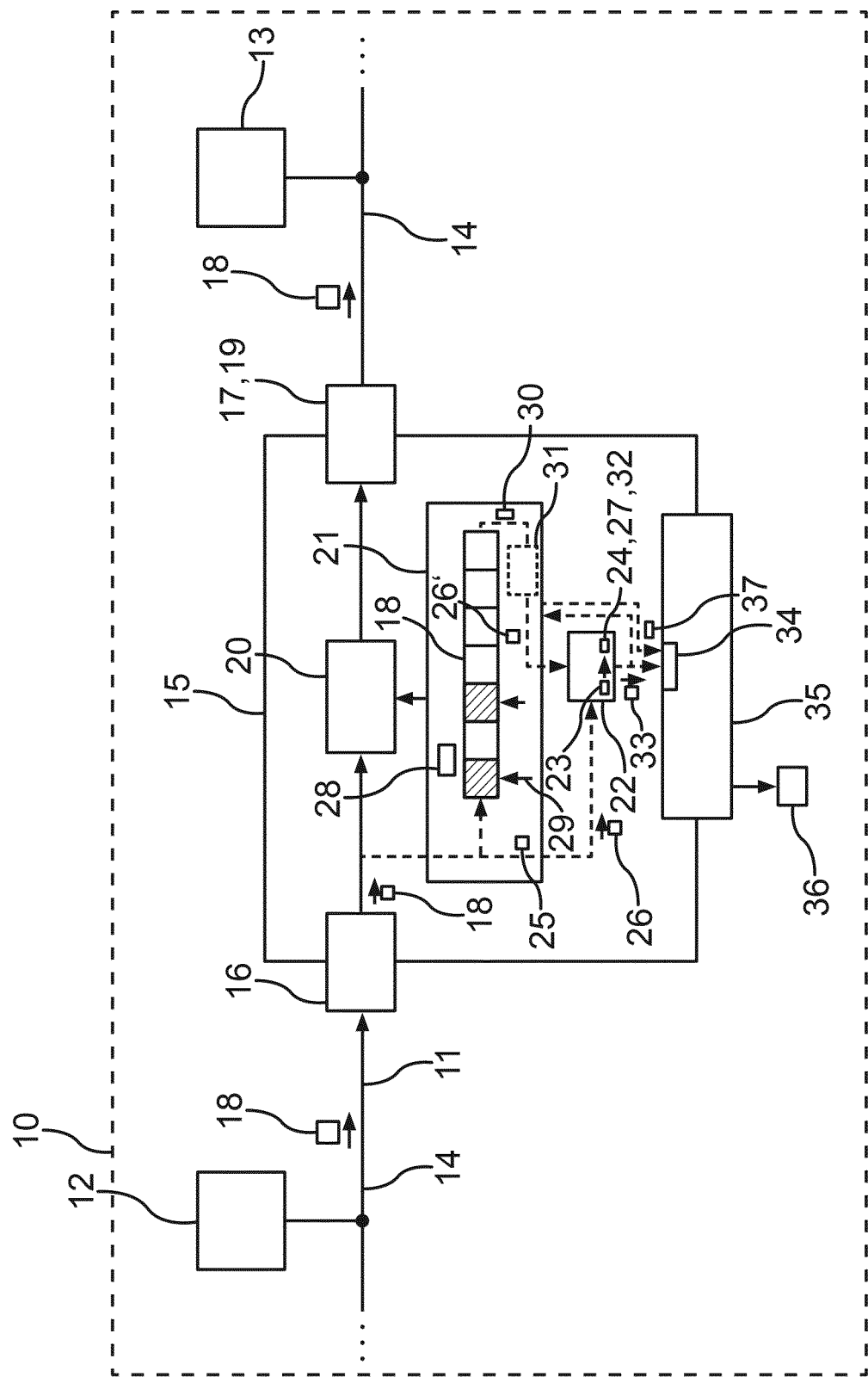

METHOD FOR MONITORING A DATA NETWORK IN A MOTOR VEHICLE, AND SWITCH DEVICE, AND MOTOR VEHICLE

BACKGROUND

Technical Field

The disclosure relates to a method for monitoring a data network in a motor vehicle. The monitoring occurs in a switch device, which passes data packets between network branches of the data network. Without a delay or latency occurring in forwarding herein, the data packets or at least some thereof are to be examined to the effect if it is predetermined, undesired data traffic, as it can for example be a constituent of a hacker attack or be caused by a manipulated and/or defective control device of the motor vehicle. A switch device, which can be used in a data network of a motor vehicle for monitoring, as well as a motor vehicle with a data network and the switch device are also disclosed.

Description of the Related Art

In a motor vehicle, control devices can be coupled to each other via a data network to exchange data packets, whereby a vehicle functionality including multiple control devices can be realized. An example for such a data network is an Ethernet network. Network branches of such a data network can be interconnected via a switch device (a short term is also "switch"), that is a data switch. Thereto, each network branch can be connected to a respective port, which is a physical connection for a network branch as well as a circuit for transmitting and receiving data packets. If a data packet arrives at a port of the switch, thus, it is ascertained, into which other network branch or into which multiple other network branches the data packet has to be forwarded. The data packet is then forwarded or transmitted to the corresponding port within the switch device by a switch circuit. The switch circuit is controlled by a network processor, which ascertains the respective target port.

In order to ascertain where a received data packet has to be forwarded to, thus, at which target port it has to be passed through the switch circuit, a so-called associative memory can be provided. Another designation for such an associative memory is also CAM filter (CAM—content addressable memory), such as for example the TCAM (ternary content addressable memory). The so-called switching or routing in a switch circuit of a switch device can be controlled by it. By the switched forwarding of data packets, network branches can be kept logically separated from each other, whereby a firewall functionality can also be realized. In an associative memory, a limited number of bits or bytes can be input from the received data packet as input data to obtain target port data, which describes the at least one target port to be used. The more of such target determination data from a received data packet an associative memory is to be able to process, thus, the longer or the more data from a received data packet is to be able to be processed, the more chip area and power consumption are required in an associative memory. Therefore, it is costly to provide an expensive associative memory in a switch device, wherefore one wishes to prevent this.

For the recognition of a manipulation in the data network, thus a so-called IDS (intrusion detection system) and a firewall functionality, on the contrary, one is interested in analyzing as many data of the data packet as possible of a received data packet. This is opposed to the constraint to provide the associative memory as inexpensive as possible. Thus, higher protocol layers can for example only be analyzed with an associative memory if it is correspondingly expensively configured and thereby costly.

The examination of email data traffic for undesired sender addresses can for example be performed by an associative memory, which is described in US 2005/0 216 770 A1. However, this requires a correspondingly costly TCAM.

From US 2007/022474 A1, it is known that an associative CAM memory can be used for storing data for different filter applications at the same time.

BRIEF SUMMARY

Embodiments of the invention may perform monitoring of a data network for undesired data packets or data contents by the limited resources of an associative memory and a network processor associated therewith.

According to one or more embodiments of the invention, a method is described to monitor a data network in a motor vehicle, wherein a switch device is operated in the data network, in which physical ports for receiving and for transmitting data packets are interconnected via a switch circuit (i.e., the actual switch or the actual data switch), and in the method, target determination data is read out from a respective data packet, which has been received via one of the ports, by said network processor. The target determination data is data, which is read out in predetermined selection positions of the data packet, e.g., in predetermined byte positions (e.g., byte 5 to byte 11). Then, so-called target port data, which indicates at least one target port for the data packet, is associated with the target determination data by an associative memory. From the present ports, at least one is then selected as the target port according to this target port data. The received data packet is then passed to the at least one target port for transmission by the switch circuit. Thus, aspects of the invention are based on the switch device known per se, a so-called switch, via which network branches of a data network can be interconnected to each other. Thereto, the target determination data is read out from a data packet in the selection positions of the data packet for ascertaining the target ports. By an associative memory, the required target port data is associated with the target determination data, which indicates, via which target port the data packet is again to be output into the data network, that is into which network branch the data packet is to be forwarded. The selection positions of a data packet can for example describe the MAC address from the data packet (MAC—media access control) and/or an IP address (IP—internet protocol) to just name examples. Here, the "switching" and/or "routing" known per se from the prior art can be performed. In the described manner, each physical port can provide a mechanical connection for a network cable of a network branch and/or a transceiver circuit for receiving and transmitting data packets in a manner known per se.

Advantageously, an aspect of the invention provides that at least one data pattern of a packet type and/or data content to be monitored and/or detected is additionally kept stored as possible target determination data respectively together with respectively associated action data in the associative memory. In other words, thus, the associative memory is not only prepared with data patterns for target determination data, which results in target port data for forwarding a received data packet, but further memory cells or memory registers of the associative memory are additionally occupied with such data patterns, which are to result in action data, if the respective data pattern is recognized in a received data packet. Correspondingly, an aspect of the invention further provides that monitoring positions for detection data to be monitored are set in addition to the selection positions for the described target determination data in the network processor, thus such positions in a received data packet, where data is located, which can indicate a manipulation of the data network. Furthermore, it is then provided that the network processor reads out the detection data from the data packet in the monitoring positions and forms data therefrom, which is here referred to as pseudo target determination data because it is used as input data for the associative memory, just as the target determination data itself. Here, the associative memory does not have to be differently configured in terms of hardware. By inputting this pseudo target determination data into the associative memory, it is examined which action data results. In other words, further selection positions are defined in the network processor, which are here referred to as monitoring positions or detection positions. In these monitoring positions, thus, at predetermined bits or bytes of the data packet, the data contents of the data packet are also to be read out. By this read-out data, the detection data then results. This detection data can be treated like the target determination data, that means it can be input into or provided to the associative memory as result data. The associative memory then responds in the same manner as also to target determination data, this means it outputs the associated data upon coincidence with one of the data patterns in the associative memory, but which is now not target port data, but said action data. Because the detection data can be used like the target determination data, it is here also described as pseudo target determination data, that means the associative memory does not have to be specially equipped or expanded in any manner A data pattern can be a bit pattern or byte pattern.

If the action data is then present, because in a data packet, the detection data thereof corresponds to a data pattern for action data, it is provided that a detection action for the data packet is controlled or started according to the resulting action data, and result data resulting from this detection action is provided at a data interface of a computing unit, which is coupled to the switch device via the data interface. The detection action can be performed by the network processor itself or an additional processor of the switch device. A detection action can for example be realized based on a software for the network processor. The computing unit coupled via the data interface can be based on a microprocessor, i.e., a CPU or a signal processor. Therefore, the computing unit is here referred to as microprocessor in the following.

By the detection action, it can then be provided that further packet data of the data packet is for example examined in the data packet to the effect if it corresponds to a predetermined additional data pattern. Thus, a detection action can include an additional examination or a deepened examination of the data packet. The result data of this detection action is then passed out of the switch device, namely via the data interface to said external microprocessor, which can thereupon recognize if malware or harmful data is present in the data network based on the result data. Based on the result data, the microprocessor can generate a response to or an indication of a hacker attack or a manipulation of at least one control device of the data network. As a response to an undesired sender, a data packet can for example be deleted. Additionally or alternatively, a detection action can include that the data packet is passed to the microprocessor via the data interface such that the data packet itself can be examined. A detection action can include that a predetermined statistic measure, in particular a transmission rate, to the data packet is ascertained in that timestamps of a respective transmitting and/or receiving point of time of the data packet and of further data packets of the same packet type and/or sender and/or receiver are captured. The expert can determine a suitable detection action depending on the monitoring task. Here, embodiments of the invention can offer a framework to outsource a required detection action from the microprocessor via the data interface into a switch device.

Thus, the microprocessor can recognize based on the data traffic passed via the switch device, that is based on the received data packets forwarded via the target ports, if an undesired state of at least one control device is present in the data network of the motor vehicle. Hereto, it is not required that the data traffic is decelerated or provided with a significant latency since the associative memory and the associated or assisting network processor process the data packets for initiating detection actions in the same manner as it also occurs for forwarding. Thus, hardware can be used, which can be adapted to the transfer rate or the data throughput of the switch device.

Additional advantages may arise in various embodiments of the invention.

An embodiment includes that multiple datasets are provided for respective, different monitoring positions (position datasets). Thus, from a received data packet, the detection data (bits and/or bytes) does not always have to be read out in the same monitoring positions (bit positions and/or byte positions). Rather, it is provided that a packet characteristic of the respective data packet is ascertained by the network processor based on data of the data packet. Furthermore, it is provided that depending on the packet characteristic, one of said position datasets is selected (thus the relevant monitoring positions are determined) and the detection data is read out in the monitoring positions indicated by the selected position dataset. In other words, depending on the data of the currently received data packet, it can be dynamically selected, at which locations or monitoring positions of the data packet data is read out to merge it to detection data. In particular, it is respectively provided that only a part of the data of the data packet is read out as detection data such that the associative memory thus has to be able to process less data than the entire data packet or in particular even less data than the so-called packet header of the data packet as input data.

As the data for selecting the detection data, header data and/or payload data of the data packet can be selected, wherein the monitoring positions preferably only include a part of the header data or a part of the payload data, thus not the entire header data or payload data.

An embodiment includes that the packet characteristic indicates a communication protocol and/or a packet type and/or data contents. The selection of the position dataset for the monitoring positions can for example provide in case of the communication protocol that it is distinguished between the TCP (transport control protocol) and the UDP (user datagram protocol) or generally between different Internet protocols. As the packet type, it can for example be distinguished between a first packet of a communication or session and a subsequent packet. As the data contents, a transmitter address and/or receiver address and/or a transmitter port and/or a receiver port can for example be taken into account.

In a motor vehicle, there is the particularity that at least a part of the data traffic is generated by control devices, which follow a fixedly programmed transmission scheme. Only a previously known portion of the data traffic is dynamic, for example data traffic of a control device for entertainment electronics. However, the portion can also be zero. An embodiment includes that the microprocessor recognizes based on transmission schedule data describing an intended transmission scheme of the control devices, based on a predetermined comparison routine that the result data deviates from the transmission scheme. Based on transmission schedule data, the microprocessor can thus recognize when the result data deviates from the transmission scheme, and it can initiate a predetermined defense routine in this case. In which case a significant deviation from the transmission scheme is present, can be defined by the expert by the comparison routine. For example, a predetermined deviation of a timestamp of the data packet from the transmission scheme can be recognized. For multiple data packets, which contain a common data pattern, which is detected by the associative memory, it can for example be examined if transmitting times and/or a transmitting order and/or time intervals correspond to the transmission scheme or deviate from it.

Thus, the realization is here at the basis that in an unmanipulated motor vehicle, thus if none of the control devices deviates from its transmission scheme and an additional device either is not connected to the data network and does not generate additional data traffic, then, only such result data may result, which corresponds to the transmission scheme according to the comparison routine, as it is described by the transmission schedule data, which, e.g., the manufacturer of the motor vehicle can specify. The comparison routine can request an exact coincidence with this transmission schedule data or a tolerance for counter values and/or data contents of the final result data can be allowed. In particular, the described method can be applied to Ethernet data packets. An Ethernet as a data network is based on packet-oriented data traffic such that (different from a time slot-oriented data network) transmitting points of time and/or data amounts can vary in the data traffic since reserved time slots are not provided. By a counter value and/or by timestamps, it can be recognized if the number of the data packets and/or a transmission rate exceed a threshold value for a certain data pattern. Since the associated data packet, which has triggered exceedance of the threshold value, can additionally also be contained in the final result data, a conclusion about the transmitter can be drawn, thus a manipulated or defective control device can be recognized, or it can be recognized that a sender address is used, which does not belong to a delivery-side control device of the motor vehicle, but to a device additionally connected to the data network.

As the defense routine or defense measure, a restriction of the functionality in the motor vehicle can for example be effected, e.g., a reduction of a functional extent or turning off the functionality, such as a media reproduction and/or a telephony function and/or an Internet connection. According to TCAM entry or data pattern, for which it is recognized that a deviation from the transmission scheme has occurred, a different functionality of the motor vehicle can be restricted or switched off.

In addition to the result data, the microprocessor can also receive a respective activity signal of at least one vehicle component and/or of a control device and then examine if the data packet has been transmitted due to this signalized activity of the vehicle component and/or the control device and thus is recognized as being outside of the transmission scheme, but is accepted as a data packet triggered by this activity and thereby is nevertheless classified as reliable such that the defense routine does not have to be initiated. The activity signal can be received, e.g., via a CAN bus.

An embodiment includes that the monitoring positions describe disjunct data areas or data fields of the data packet. The described monitoring positions, in which the data is read out from the data packet, do not have to describe a continuous sequence of bits or bytes, but at least one non-monitored bit or byte can be located between the monitoring positions, thus, data can be skipped in the data packet when the detection data is read out.

An embodiment includes that the monitoring positions and/or the data patterns and/or the action data are determined and/or changed in the operation by the microprocessor via the data interface. Thus, the microprocessor can dynamically manipulate or configure the network processor and/or the associative memory to adapt the monitoring. Hereto, the microprocessor can in particular be adapted to respond to result data, which has been generated for at least one data packet by a detection action. Herein, said transmission schedule data can also be taken as a basis. As the data pattern, so-called positive patterns can be provided in the associative memory, thus data patterns, which have to be present according to the transmission schedule data if a control device and/or the motor vehicle function in intended manner or without error. In absence of corresponding data packets, a malfunction of a component of the control device, e.g., of the network controller, can e.g. be inferred. The transmission schedule data can be adjusted, e.g., depending on an operating state of the motor vehicle (e.g., depending on a motor rotational speed).

For example, the microprocessor can also receive at least one new data pattern and/or new monitoring positions and/or new action data via a radio link from outside of the motor vehicle and then enter them into the network processor and/or the associative memory via the data interface or store them. Thus, it can be dynamically responded to a new type of attack.

An embodiment includes that in addition to the result data of the detection action or as a part of the result data or as the result data in total, the respective data packet itself or a part thereof is communicated to the microprocessor via the data interface. In other words, not only the result data itself, but also the data packet or a part thereof, for example the header data and/or the payload data (so-called payload), is communicated to the microprocessor via the data interface. The detection action can also be in providing the data packet or a part thereof as a constituent of the result data, thus, outputting the data packet or said part via the data interface. Hereby, an expanded analysis possibility relating to the data packet is then available in the microprocessor. Hereby, a new type of attack can for example be detected or ascertained.

As already explained, the detection data read out in the monitoring positions of a data packet is merged to pseudo target determination data, that means it is merged in a dataset, which can be processed or filtered in the associative memory just as the determination data itself. An embodiment includes that said forming the pseudo target determination data includes that the detection data is rearranged by a shift operation and/or combined by at least one combination rule. Preprocessing can occur in that a shift operation and/or a combination rule are applied. A combination rule can for example include a logical operation, such as for example AND (logical AND) or OR (logical OR). Thus, bits or bytes of the detection data can be merged or compressed, for example to obtain a preset format. In addition, by a shift operation and/or a combination rule, a first step of a detection of undesired data traffic in the data network can also already be performed. Thus, it can for example be examined if two predetermined bits in the detection data have a predetermined logical combination (e.g., both set or both deleted). Then, this can be represented by a single bit, which can become a constituent of the pseudo target determination data instead of the original bits. Thus, at least one shift operation and/or logical bit combination can be effected in the detection data to hereby already identify a first predetermined data pattern (for example, multiple certain bits can, e.g., all be set or deleted). Thus, undesired data traffic can be recognized not alone on the packet type and/or on the transmitting/receiving addresses, but a bit operation (shift operation and/or bit combination) can also be used as a means for detecting undesired data traffic.

Thus, the detection data of a data packet can be recognized in itself as undesired data traffic by examining bits by a shift operation and/or a combination rule. This preprocessing allows first linking data of a data packet or the detection data with each other and/or newly arranging it to first feed this result of preprocessing then into an associative memory. Thus, not simply only data from a data packet is transferred into an associative memory, but data of a data packet (detection data) is first preprocessed to hereby already implement a first step in detecting undesired data traffic.

An embodiment includes that Ethernet packets are monitored as data packets. An Ethernet as a data network can generate a plurality of states or sequences of data packets, also only predictable with great effort in a motor vehicle, due to the packet-oriented data transfer. Here, it is particularly advantageous to realize monitoring of the data network based on the individual data packets.

According to embodiments of the invention, a switch device for a data network of a motor vehicle is also described, wherein the switch device comprises a network processor and an associative memory, which are configured to perform an embodiment of the methods described herein. The switch device can be provided as a switch or router in the data network. As a router, the switch device can provide routing operations by a data processor in the known manner. The network processor and the associative memory together represent a data processing device or a processor device, which is configured to perform an embodiment of the methods described herein. Hereto, the network processor can comprise at least one microprocessor and/or at least one microcontroller and/or at least one FPGA (field programmable gate array) and/or at least one DSP (digital signal processor). A hardware specialized as a network processor from the prior art can be taken as a basis. Furthermore, the network processor can comprise a program code, which is configured to perform the part of the methods described herein, which relates to the network processor, upon execution by the network processor. The program code can be stored in a data memory of the network processor.

According to embodiments of the invention, a motor vehicle is also described, which comprises a data network, in which multiple network branches are interconnected via said switch device. A microprocessor is coupled to the switch device via a data interface in the described manner The motor vehicle is configured to perform an embodiment of the methods described herein. The motor vehicle is preferably configured as an automobile, in particular as a passenger car or truck, or as a passenger bus or motorcycle. The data network is preferably an Ethernet, which provides packet-oriented data traffic in the motor vehicle. By the data network, control devices of the motor vehicle can be coupled to each other for data exchange or data communication.

Therein, one or more control devices can each be connected to a network branch or network strand. Preferably, a single control device or a further switch device, which in turn connects network branches, is connected per network branch.

Further embodiments of the invention can include combinations of the features of the described embodiments. Thus, the invention also includes realizations, which each comprise a combination of the features of multiple of the described embodiments if the embodiments were not described as mutually exclusive.

BRIEF DESCRIPTION OF THE DRAWINGS

The sole FIGURE shows a schematic representation of a motor vehicle according to an embodiment of the invention with a switch device according to an embodiment of the invention, which can perform embodiments of the methods disclosed herein.

DETAILED DESCRIPTION

The embodiments explained in the following are example embodiments of the invention. In the embodiments, the described components of the embodiments each represent individual features of the invention to be considered independently of each other, which also each develop the invention independently of each other. Therefore, the disclosure also is to include other combinations of the features of the embodiments than the illustrated ones. Furthermore, the described embodiments can also be supplemented by further ones of the already described features of the invention.

In the FIGURE, identical reference characters each denote functionally identical elements.

The FIGURE shows a motor vehicle 10, which can be an automobile, for example a passenger car or truck. In the motor vehicle 10, a data network 11 can be provided, which can for example be an Ethernet network. Control devices 12, 13 for data communication or data exchange can be coupled to each other via the data network 11. In order to interconnect multiple network branches 14 of the data network 11 to each other, a switch device 15 can be provided. Therein, a respective network cable of a network branch 14 can be connected to a respective port 16, 17 of the switch device 15 in a manner known per se. The FIGURE exemplarily shows how the control device 12 can transmit a data packet 18 to the control device 13. Herein, the switch device 15 can receive the data packet 18 at the port 16, to which the network branch 14 of the control device 12 is connected, and select that port 17, to which the network branch 14 of the control device 13 is connected, from the multiple ports of the switch device 15 (possible further ports are not illustrated), such that the data packet 18 can be forwarded in this network branch 14 and in particular only in this network branch 14. Generally, the data packet 18 can be forwarded by the switch device 15 in particular exclusively to those network branches or that network branch, in which a control device 13 is located, to which the data packet 18 is addressed in a manner known per se, for example via a so-called IP address and/or MAC address.

In order to forward the received data packet 18 to the correct port 17, thus a target port 19, in the switch device 15, a switch circuit 20 (also referred to as switch engine), which can be configured in a manner known per se, can be provided in the switch device 15. The switch circuit 20 can be controlled by a network processor 21. For ascertaining, which target port 19 is to be adjusted for the received data packet 18 in the switch circuit 20, an associative memory 22 can be provided, in particular a TCAM. In the associative memory 22, output data 24 can be associated with a respective possible data pattern 23. From the data packet 18, the data or the data content thereof can for example be read out by the network processor 21 in preset selection positions 25 of the received data packet 18 and be merged to target determination data 26, which can be passed to the associative memory 22 as input data for it. If the target determination data 26 contains one of the data patterns 23, thus, the associative memory 22 can output the corresponding output data 24 as target port data 27. Based on the target port data 27, the network processor 21 can for example adjust or select the corresponding target port 19 in the switch circuit 20. The associative memory can be integrated in the network processor or be different from it. It can be provided that the associative memory 22 is connected to the switch circuit 20 such that the target port data 27 can be evaluated by the switch circuit 20 in direct manner, that is without the network processor 21, for selecting the target port 19.

In the motor vehicle 10, an IDS (intrusion detection system against software errors and/or malware) can also be realized by the switch device 15, that is, it can be recognized if one of the control devices 12, 13 (here, only two control devices are exemplarily illustrated) in the data network 11 is manipulated or affected by a data virus and/or if an unauthorized device is connected to the data network 11 and transmits at least one data packet via the switch device 15.

Hereto, the associative memory 22 can also be used in the switch device 15 without having to comprise an additional functionality.

Hereto, the network processor 21 can keep available at least one position dataset 28, in which monitoring positions 29 can respectively be indicated, which can indicate bits or at least one byte in the received data packet, bit positions or byte positions, in which the data content of the received data packet 18 is to be read out to obtain detection data 30. The detection data 30 can be used to generate pseudo target determination data 26'. Hereto, at least one operation 31 can be applied to the detection data 30, but the detection data 30 can also be immediately provided as the pseudo target determination data 26'. The pseudo target determination data 26' can be fed into the associative memory 22 like the target determination data 26. It also represents input data, which is examined for at least one data pattern 23. If one of the data patterns 23 applies, thus, corresponding output data 24 is output by the associative memory 22. However, this output data 24 is then action data 32, which can each be associated with a corresponding data pattern 23. A detection action 33 can be initiated by the action data 32. It can be executed by the network processor 21. The detection action 33 can also be in that the data packet 18 itself or at least a part thereof is passed to a microprocessor 35 at a data interface 34, which is to recognize a manipulated control device 12, 13 and can generate a corresponding warning notice 36 upon recognition of a manipulated control device 12, 13. The action data 32 can for example also initiate a detection action performed by the network processor 21 and further result data 37 or such a detection action can be passed or output as evaluation data to the microprocessor 35 at the data interface 34.

Thus, the main idea is in using a network processor 21 with a TCAM filter for a data analysis within the scope of an IDS. The TCAM filter can also be realized as a constituent of the network processor 21.

Thus, without generating an additional latency in the transfer of a data packet 18 between the ports 16, 17, an examination of the data packet 18 for at least one data pattern 23 can be effected, which indicates a manipulation of the data network 11. It can be responded to such a data pattern 23 with action data 24, which can initiate or control a detection action 33. Header data of a data packet 18 can be classified to identify a packet type and/or a protocol of the data packet 18 and monitoring positions 29 for selecting detection data 30 can be correspondingly determined by a position dataset 28. This detection data 30 can be merged to a detection key or input data for the associative memory, which can process it as pseudo target determination data 26'. Thus, it can be resorted to the optimized data processing of a TCAM filter.

The network processor can be programmed and/or configured to the effect that it recognizes and distinguishes different packet types for example based on the header data with the transfer speed of the data network, that is without addition of a further latency, and to select different position datasets for determining the monitoring positions, in which data is extracted or read out of the data packet, based on the packet type or header type. This can also be configurable or programmable such that the microprocessor 35 can for example perform an adaptation or change in the operation of the switch device 15 to dynamically adapt the monitoring. If a data packet is categorized as unsuspicious or normal or expected, thus an admissible data packet, the next data packet can be processed.

The read-out detection data can be combined or generally processed before feeding or inputting into the associative memory, such that different parts of the data packet are combined, whereby the data analysis can be assisted. For example, a shift operation and/or a combination of multiple different processing rules and/or logical combinations can be provided. Thereafter, this pseudo target determination data, thus the newly combined data, can be examined in the associative memory, in particular a TCAM, to the effect if action data results or which is associated. If action data results, thus, the network processor can respond to it in that it for example passes the data packet to a software framework, which can be executed by a microprocessor, at the described data interface.

Overall, the examples show how a network processor and a TCAM associative memory can be combined for network monitoring.

Thus, in summary, embodiments of the invention in particular relate to the following aspects:

1. A method for monitoring a data network (11) in a motor vehicle (10), wherein a switch device (15) is operated in the data network (11), in which physical ports (16, 17) for receiving and for transmitting data packets (18) are interconnected via a switch circuit (20), and in the method, target determination data (26) is read out from a respective data packet (18), which is received via one of the ports (16, 17), in predetermined selection positions (25) of the data packet (18) by a network processor (21), and target port data (27), which indicates at least one target port (19) for the data packet (18), is associated with the target determination data (26) by an associative memory (22), and at least one of the ports (16, 17) is selected as a respective target port (19) according to the target port data (27), and the received data packet (18) is passed to the at least one target port (19) for transmitting by the switch circuit (20), characterized in that at least one data pattern (23) of a packet type and/or data content to be monitored and/or detected is additionally kept stored as possible target determination data respectively together with respectively associated action data (32) in the associative memory (22), and in addition to the selection positions (25) for the target determination data (26) of the respective data packet (18), monitoring positions (29) of detection data (30) of the respective data packet (18) to be monitored are also determined in the network processor (21), and the network processor (21) reads out the detection data (30) from the data packet (18) in the monitoring positions (29) and forms pseudo target determination data (26') from the detection data (30), and examines which action data (32) results, by inputting the pseudo target determination data (26) into the associative memory (22), and a detection action (33) for the data packet (18) is controlled according to the resulting action data (32), and result data (37) of the detection action is signalized via a data interface (34) to a microprocessor (35), which is coupled to the switch device (15) via the data interface (34).

2. The method according to aspect 1, wherein multiple datasets are provided for respective, different monitoring positions (29), and a packet characteristic of the respective data packet (18) is ascertained by the network processor (21) based on data of the data packet (18), and one of the datasets is selected depending on the ascertained packet characteristic and the detection data (30) is read out in the monitoring positions indicated by the selected dataset (28).

3. The method according to aspect 2, wherein the packet characteristic indicates a communication protocol and/or packet type and/or data contents.

4. The method according to any one of the preceding aspects, wherein the microprocessor (35) recognizes based on transmission schedule data, which describes an intended transmission scheme of control devices, which communicate via the data network (11), by a predetermined comparison routine that the result data (37) deviates from the transmission scheme, and initiates a predetermined defense routine (35) in this case.

5. The method according to any one of the preceding aspects, wherein the monitoring positions (29) describe disjunct data fields of the data packet (18).

6. The method according to any one of the preceding aspects, wherein the action data (34) is determined and/or changed in the operation by the microprocessor (35) via the data interface (34).

7. The method according to any one of the preceding aspects, wherein the respective data packet (18) or a part thereof is communicated to the microprocessor via the data interface (34) in addition to the result data (37) of the detection action (33) or as a constituent of the result data (37).

8. The method according to any one of the preceding aspects, wherein forming the pseudo target determination data (26) from the detection data (30) of the data packet (18) includes that the detection data (30) is rearranged by a shift operation (31) and/or combined by at least one combination rule.

9. The method according to any one of the preceding aspects, wherein Ethernet packets are monitored as the data packets (18).

10. A switch device (15) for a data network (11) of a motor vehicle (10), wherein the switch device (15) comprises a network processor (21) and an associative memory (22), which are configured to perform the steps of a method according to any one of the preceding aspects relating to the network processor (21) and the associative memory (22).

11. A motor vehicle (10) with a data network (11), in which multiple network branches are interconnected via a switch device (15) according to aspect 10, and with a microprocessor (35), which is coupled to the switch device (15) via a data interface, wherein the motor vehicle (10) is configured to perform a method according to any one of aspects 1 to 9.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for monitoring a data network in a motor vehicle, wherein in the data network a switch device is operated, in which physical ports for receiving and for transmitting data packets are interconnected via a switch circuit, the method comprising:
    reading out target determination data from a respective data packet, which is received via one of the physical ports, at predetermined selection positions of the respective data packet by a network processor,
    associating target port data, which indicates at least one target port for the respective data packet, with the target determination data by an associative memory,
    selecting at least one of the physical ports as a respective target port according to the target port data,
    passing the respective data packet to the at least one target port for transmitting by the switch circuit,
    storing at least one data pattern of a packet type and/or data content to be monitored and/or detected as possible target determination data respectively together with respectively associated action data in the associative memory,
    determining, in addition to the predetermined selection positions for the target determination data of the respective data packet, monitoring positions of detection data of the respective data packet to be monitored in the network processor,
    reading out, by the network processor, the detection data from the respective data packet at the monitoring positions and forming pseudo target determination data from the detection data, wherein forming the pseudo target determination data from the detection data of the respective data packet includes that the detection data is rearranged by a shift operation and/or combined by at least one combination rule, and examining, by the network processor, which action data results, by inputting the pseudo target determination data into the associative memory, and
    controlling a detection action for the respective data packet according to the resulting action data, and signalizing result data of the detection action via a data interface to a microprocessor, which is coupled to the switch device via the data interface,
    wherein multiple datasets are provided for respective, different monitoring positions, and a packet characteristic of the respective data packet is ascertained by the network processor based on data of the respective data packet, and one of the datasets is selected depending on the packet characteristic and the detection data are read out in the monitoring positions indicated by the one of the datasets that is selected.

2. The method according to claim 1, wherein the packet characteristic indicates a communication protocol and/or packet type and/or data contents.

3. The method according to claim 1, wherein the microprocessor recognizes based on transmission schedule data, which describes an intended transmission scheme of control devices, which communicate via the data network, by a predetermined comparison routine that the result data deviates from the intended transmission scheme, and initiates a predetermined defense routine in this case.

4. The method according to claim 1, wherein the monitoring positions describe disjunct data fields of the respective data packet.

5. The method according to claim 1, wherein the action data are determined and/or changed by the microprocessor via the data interface.

6. The method according to claim 1, wherein the respective data packet or a part thereof is communicated to the microprocessor via the data interface in addition to the result data of the detection action or as a constituent of the result data.

7. The method according to claim 1, wherein Ethernet packets are monitored as the data packets.

8. A switch device for a data network of a motor vehicle, wherein the switch device comprises a network processor and an associative memory, which are configured to perform a method comprising:

reading out target determination data from a respective data packet, which is received via one of a plurality of physical ports of the switch device, at predetermined selection positions of the respective data packet by the network processor, associating target port data, which indicates at least one target port for the respective data packet, with the target determination data by the associative memory, selecting at least one of the physical ports as a respective target port according to the target port data, passing the respective data packet to the at least one target port for transmitting by a switch circuit of the switch device, storing at least one data pattern of a packet type and/or data content to be monitored and/or detected as possible target determination data respectively together with respectively associated action data in the associative memory, determining, in addition to the predetermined selection positions for the target determination data of the respective data packet, monitoring positions of detection data of the respective data packet to be monitored in the network processor, reading out, by the network processor, the detection data from the respective data packet at the monitoring positions and forming pseudo target determination data from the detection data, wherein forming the pseudo target determination data from the detection data of the respective data packet includes that the detection data is rearranged by a shift operation and/or combined by at least one combination rule, and examining, by the network processor, which action data results, by inputting the pseudo target determination data into the associative memory, and controlling a detection action for the respective data packet according to the resulting action data, and signalizing result data of the detection action via a data interface to a microprocessor, which is coupled to the switch device via the data interface, wherein multiple datasets are provided for respective, different monitoring positions, and a packet characteristic of the respective data packet is ascertained by the network processor based on data of the respective data packet, and one of the datasets is selected depending on the packet characteristic and the detection data are read out in the monitoring positions indicated by the one of the datasets that is selected.

9. A motor vehicle with a data network, in which multiple network branches are interconnected via a switch device, and with a microprocessor, which is coupled to the switch device via a data interface, wherein the motor vehicle is configured to perform a method comprising:

reading out target determination data from a respective data packet, which is received via one of a plurality of physical ports of the switch device, at predetermined selection positions of the respective data packet by a network processor, associating target port data, which indicates at least one target port for the respective data packet, with the target determination data by an associative memory of the switch device, selecting at least one of the physical ports as a respective target port according to the target port data, passing the respective data packet to the at least one target port for transmitting by a switch circuit of the switch device, storing at least one data pattern of a packet type and/or data content to be monitored and/or detected as possible target determination data respectively together with respectively associated action data in the associative memory, determining, in addition to the predetermined selection positions for the target determination data of the respective data packet, monitoring positions of detection data of the respective data packet to be monitored in the network processor, reading out, by the network processor, the detection data from the respective data packet at the monitoring positions and forming pseudo target determination data from the detection data, wherein forming the pseudo target determination data from the detection data of the respective data packet includes that the detection data are rearranged by a shift operation and/or combined by at least one combination rule, and examining, by the network processor, which action data results, by inputting the pseudo target determination data into the associative memory, and controlling a detection action for the respective data packet according to the resulting action data, and signalizing result data of the detection action via the data interface to the microprocessor, wherein multiple datasets are provided for respective, different monitoring positions, and a packet characteristic of the respective data packet is ascertained by the network processor based on data of the respective data packet, and one of the datasets is selected depending on the packet characteristic and the detection data are read out in the monitoring positions indicated by the one of the datasets that is selected.

10. A method for monitoring a data network in a motor vehicle, wherein in the data network a switch device is operated, in which physical ports for receiving and for transmitting data packets are interconnected via a switch circuit, the method comprising:

reading out target determination data from a respective data packet, which is received via one of the physical ports, at predetermined selection positions of the respective data packet by a network processor, associating target port data, which indicates at least one target port for the respective data packet, with the target determination data by an associative memory, selecting at least one of the physical ports as a respective target port according to the target port data, passing the respective data packet to the at least one target port for transmitting by the switch circuit, storing at least one data pattern of a packet type and/or data content to be monitored and/or detected as possible target determination data respectively together with respectively associated action data in the associative memory, determining, in addition to the predetermined selection positions for the target determination data of the respective data packet, monitoring positions of detection data of the respective data packet to be monitored in the network processor, reading out, by the network processor, the detection data from the respective data packet at the monitoring positions and forming pseudo target determination data from the detection data, wherein forming the pseudo target determination data from the detection data of the respective data packet includes that the detection data are rearranged by a shift operation and/or combined by at least one combination rule, and examining, by the network processor, which action data results, by inputting the pseudo target determination data into the associative memory, and controlling a detection action for the respective data packet according to the resulting action data, and signaling result data of the detection action via a data interface to a microprocessor, which is coupled to the switch device via the data interface, wherein the microprocessor recognizes based on transmission schedule data, which describes an intended transmission scheme of control devices, which communicate via the data network, by a predetermined comparison routine that the result data deviates from the intended transmission scheme, and initiates a predetermined defense routine in this case.

11. A switch device for a data network of a motor vehicle, wherein the switch device comprises a network processor and an associative memory, which are configured to perform a method comprising:

reading out target determination data from a respective data packet, which is received via one of a plurality of physical ports of the switch device, at predetermined selection positions of the respective data packet by the network processor, associating target port data, which indicates at least one target port for the respective data packet, with the target determination data by the associative memory, selecting at least one of the physical ports as a respective target port according to the target port data, passing the respective data packet to the at least one target port for transmitting by a switch circuit of the switch device, storing at least one data pattern of a packet type and/or data content to be monitored and/or detected as possible target determination data respectively together with respectively associated action data in the associative memory, determining, in addition to the predetermined selection positions for the target determination data of the respective data packet, monitoring positions of detection data of the respective data packet to be monitored in the network processor, reading out, by the network processor, the detection data from the respective data packet at the monitoring positions and forming pseudo target determination data from the detection data, wherein forming the pseudo target determination data from the detection data of the respective data packet includes that the detection data are rearranged by a shift operation and/or combined by at least one combination rule, and examining, by the network processor, which action data results, by inputting the pseudo target determination data into the associative memory, and controlling a detection action for the respective data packet according to the resulting action data, and signaling result data of the detection action via a data interface to a microprocessor, which is coupled to the switch device via the data interface, wherein the microprocessor recognizes based on transmission schedule data, which describes an intended transmission scheme of control devices, which communicate via the data network, by a predetermined comparison routine that the result data deviates from the intended transmission scheme, and initiates a predetermined defense routine in this case.

12. A motor vehicle with a data network, in which multiple network branches are interconnected via a switch device, and with a microprocessor, which is coupled to the switch device via a data interface, wherein the motor vehicle is configured to perform a method comprising:

reading out target determination data from a respective data packet, which is received via one of a plurality of physical ports of the switch device, at predetermined selection positions of the respective data packet by a network processor, associating target port data, which indicates at least one target port for the respective data packet, with the target determination data by an associative memory of the switch device, selecting at least one of the physical ports as a respective target port according to the target port data, passing the respective data packet to the at least one target port for transmitting by a switch circuit of the switch device, storing at least one data pattern of a packet type and/or data content to be monitored and/or detected as possible target determination data respectively together with respectively associated action data in the associative memory, determining, in addition to the predetermined selection positions for the target determination data of the respective data packet, monitoring positions of detection data of the respective data packet to be monitored in the network processor, reading out, by the network processor, the detection data from the respective data packet at the monitoring positions and forming pseudo target determination data from the detection data, wherein forming the pseudo target determination data from the detection data of the respective data packet includes that the detection data are rearranged by a shift operation and/or combined by at least one combination rule, and examining, by the network processor, which action data results, by inputting the pseudo target determination data into the associative memory, and controlling a detection action for the respective data packet according to the resulting action data, and signaling result data of the detection action via the data interface to the microprocessor, wherein the microprocessor recognizes based on transmission schedule data, which describes an intended transmission scheme of control devices, which communicate via the data network, by a predetermined comparison routine that the result data deviates from the intended transmission scheme, and initiates a predetermined defense routine in this case.

* * * * *

UNITED STATES PATENT AND TRADEMARK OFFICE
CERTIFICATE OF CORRECTION

PATENT NO. : 12,363,149 B2  
APPLICATION NO. : 17/918482  
DATED : July 15, 2025  
INVENTOR(S) : Karsten Schmidt et al.

Page 1 of 1

It is certified that error appears in the above-identified patent and that said Letters Patent is hereby corrected as shown below:

On the Title Page

<u>Item (73) Assignees:</u>  
"TITECH AUTO AG, Vienna (AT)  
Should read:  
--TTTECH AUTO AG, Vienna (AT)--.

In the Claims

<u>Column 13, Claim 8, Line 50:</u>  
"is are rearranged"  
Should read:  
--are rearranged--.

Signed and Sealed this  
Thirtieth Day of September, 2025

John A. Squires  
*Director of the United States Patent and Trademark Office*